(12) United States Patent
Fukuda et al.

(10) Patent No.: US 8,775,767 B2
(45) Date of Patent: Jul. 8, 2014

(54) METHOD AND SYSTEM FOR ALLOCATING MEMORY TO A PIPELINE

(75) Inventors: Atsushi Fukuda, Saitama-ken (JP); Masakuni Okada, Kanagawa (JP); Kazuto Yamafuji, Yokohama (JP); Takashi Yonezawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 13/207,528

(22) Filed: Aug. 11, 2011

(65) Prior Publication Data

US 2012/0066470 A1 Mar. 15, 2012

(30) Foreign Application Priority Data

Sep. 10, 2010 (JP) .................... 2010-203650

(51) Int. Cl.
*G06F 12/00* (2006.01)
*G06F 9/00* (2006.01)
*G06F 12/02* (2006.01)
*G06F 9/38* (2006.01)

(52) U.S. Cl.
CPC ............ *G06F 12/023* (2013.01); *G06F 9/3851* (2013.01); *G06F 9/3885* (2013.01)
USPC ........................................................ 711/171

(58) Field of Classification Search
CPC ........................ G06F 12/023; G06F 9/3851
See application file for complete search history.

(56) References Cited

U.S. PATENT DOCUMENTS

| | | | |
|---|---|---|---|
| 6,611,855 B1 | 8/2003 | Hellberg et al. | |
| 6,647,150 B2 | 11/2003 | Van der Wal | |
| 7,081,897 B2 | 7/2006 | Garg | |
| 7,636,498 B2 | 12/2009 | Furukawa et al. | |
| 2008/0062464 A1 | 3/2008 | Sugi | |

FOREIGN PATENT DOCUMENTS

| | | |
|---|---|---|
| JP | 2005309510 A | 11/2005 |
| JP | 2005322049 A | 11/2005 |
| JP | 2007279829 A | 10/2007 |
| JP | 2009118277 A | 5/2009 |
| JP | 2009223792 A | 10/2009 |
| JP | 2010068686 A | 3/2010 |

*Primary Examiner* — Matthew Bradley
*Assistant Examiner* — Craig Goldschmidt
(74) *Attorney, Agent, or Firm* — Schmeiser, Olsen & Watts, LLP; John Pivnichny

(57) ABSTRACT

A method, and associated system, for allocating memory to a first pipeline that includes a sequence of filters. Each filter is configured to execute a process specific to each filter, receive input data, and generate output data. The output data from each filter, except the last filter in the sequence, serves as the input data to the next filter in the sequence. An optimum memory capacity is allocated to the first pipeline if possible. Otherwise, a guaranteed memory bandwidth is allocated to the first pipeline if possible. Otherwise, extra memory currently allocated to a second pipeline is currently released if the second pipeline not currently performing processing or subsequently released when the second pipeline subsequently completes performing processing that is currently being performed, followed by allocating the extra memory to the first pipeline.

20 Claims, 9 Drawing Sheets

METHOD AND SYSTEM FOR ALLOCATING MEMORY TO A PIPELINE

FIELD OF THE INVENTION

The present invention relates to a system for performing data processing using pipeline processing with pipes and filters, and a method of allocating memory to the system.

BACKGROUND OF THE INVENTION

In the data processing of architectural patterns, there is a pattern called the pipes and filters pattern. According to the pipes and filters pattern, software components called filters having the function of inputting, processing and outputting data are connected by pipes so that the connected filters will carry out pipeline processing for processing data sequentially (note that a group of filters for performing one pipeline processing and a set of pipes connecting the filters (pipes and filters) are called a "pipeline" below). Desired filters are connected in desired order to enable various processing, and this makes it easy to configure complicated processing.

Here, the filter is a main component for performing data processing in pipeline processing, and each individual filter process is executed by a processing function such as a CPU (Central Processing Unit) under the control of a computer program. Each of the filter processes configuring one pipeline is not necessarily executed by a single CPU or core, and the filter processes may be executed by different cores, filter by filter. The pipe is a function implemented by a memory such as a RAM (Random Access Memory) to connect the output (standard output) of one filter with the input (standard input) of another filter that follows the one filter.

In an actual system, multiple pipelines may be prepared to perform various processing in parallel. In the meantime, the amount of memory available for pipeline processing may be limited because of the limitations of hardware resources. Thus, in a system for performing pipeline processing, the system performance is significantly affected by how memory is allocated to each pipeline and each of the filters forming the pipeline.

Japanese Patent Application Publication No. 2010-68486 discloses a technique for dynamically allocating memory to pipeline processing as a conventional technique related to memory allocation in a pipes-and-filters architecture. In the conventional technique disclosed in the document, when a memory work area is not enough to perform one pipeline processing, work areas allocated to the other pipelines or some of them are released and allocated to the one pipeline to which memory is not allocated sufficiently.

SUMMARY OF THE INVENTION

The present invention provides a method, and associated computer system and computer program product, for allocating memory to a pipeline, said method comprising:

ascertaining whether an optimum memory capacity can be allocated to a first pipeline that comprises a sequence of filters, wherein each filter is configured to execute a process specific to each filter, receive input data to enable execution the process, and generate output data resulting from execution of the process, and wherein the output data generated by each filter except the last filter is the input data to a next filter in the sequence of filters;

if said ascertaining whether the optimum memory capacity can be allocated to the first pipeline ascertains that the optimum memory capacity can be allocated to the first pipeline, then allocating the optimum memory capacity to the first pipeline, else ascertaining whether a guaranteed memory bandwidth can be allocated to the first pipeline;

if said ascertaining whether the guaranteed memory bandwidth can be allocated to the first pipeline ascertains that the guaranteed memory bandwidth can be allocated to the first pipeline, then allocating the guaranteed memory bandwidth to the first pipeline, else currently releasing extra memory from a second pipeline if the second pipeline is not currently performing processing or subsequently releasing the extra memory from the second pipeline when the second pipeline subsequently completes performing processing that is currently being performed, followed by allocating the extra memory to the first pipeline.

DETAILED DESCRIPTION OF THE INVENTION

Figure 1:
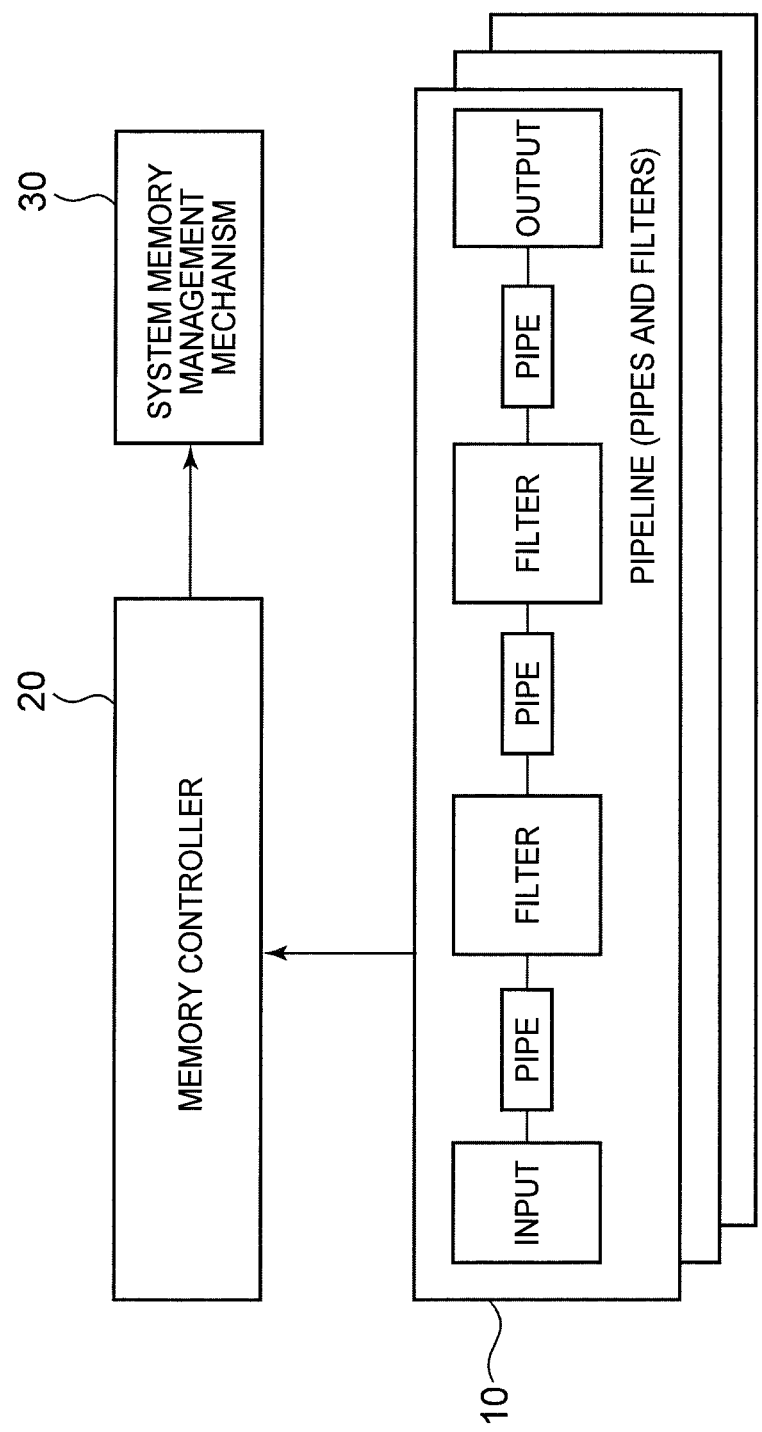
FIG. 1 is a diagram showing the functional configuration of a memory management system, in accordance with embodiments of the present invention.

The present invention makes efficient use of memory in a system for performing pipeline processing with pipes and filters and improves the performance of the system.

The present invention is implemented as the following system: This system includes one or multiple data processing means for performing a series of processing on data, and memory allocation means for allocating, to this data processing means, memory used for data processing. The data processing means includes input means for inputting data to be processed, one or multiple individual processing means for executing individual processes constituting the series of processing for the input data, output means for outputting data after being subjected to the series of processing, and buffer means used to pass data among the input means, the individual processing means, and the output means. Upon allocating memory to the data processing means that is to perform data processing, when the amount of available memory to a pipeline is equal to or more than an optimum capacity (i.e., optimum memory capacity) of the pipeline. The optimum capacity (i.e., optimum memory capacity) of a pipeline is defined as a minimum amount of memory to realize an optimum state of the pipeline. In the optimum state, data to be processed by all the individual processing means (i.e., filters) of the pipeline is held in the buffer means while the data processing means is performing processing, and the memory allocation means allocates the optimum capacity to the data processing means (i.e., filters). When the amount of available memory is less than the optimum capacity and equal to or more than a guaranteed amount of memory as the sum of memory capacities necessary for the processes executed by the individual processing means, the memory allocation means allocates the guaranteed amount of memory to the data processing means.

In one embodiment, when the amount of available memory is less than the guaranteed amount of memory of the data processing means that is to perform data processing, the memory allocation means should cause data processing means, to which an amount of memory equal to or more than the guaranteed amount of memory is allocated among the other data processing means already performing processing, to release memory by an amount exceeding the guaranteed amount of memory, and should allocate the guaranteed amount of memory to the data processing means when the obtained amount of available memory becomes equal to or more than the guaranteed amount of memory of the data processing means that is to perform the data processing.

In one embodiment, when the optimum capacity is not set for the data processing means that is to perform data processing, if there is an amount of available memory enough to allocate memory equal to or more than the guaranteed amount of memory to the data processing means, the memory allocation means should allocate, to the data processing means, an amount of memory defined according to the amount of available memory.

In one embodiment, the memory allocation means should determine whether memory usage when the data processing means performs processing is in the optimum state, and dynamically set the optimum capacity based on the determination result.

To be more specific, when a waiting state in writing data from one individual processing means to the buffer means and a waiting state in reading data from the buffer means by means of the following individual processing means are created at a certain frequency or higher as a state of memory usage when the data processing means performs processing, the memory allocation means increases, to the optimum state, the amount of allocation of memory used as the buffer means.

Alternatively, if the state of memory usage when the data processing means performs processing is in the optimum state, the memory allocation means focuses attention on the individual processing means in due order according to a predetermined rule to carry on the processing for reducing the amount of allocation of memory used as the buffer means holding the data read by the individual processing means, on which attention is focused, as long as the optimum state is maintained.

Also, in order to attain the above object, the system of the present invention is a system for performing data processing including one or multiple data processing means for performing a series of processing on data, and memory allocation means for allocating, to the data processing means, memory to be used for data processing. The data processing means includes input means for inputting data to be processed, one or multiple individual processing means for executing individual processes constituting the series of processing for the input data, output means for outputting data after being subjected to the series of processing, and buffer means used to pass data among the input means, the individual processing means, and the output means.

Upon allocation of memory to the data processing means that is to perform data processing, when an optimum capacity (to realize an optimum state as a state in which data to be processed by all the individual processing means is held in the buffer means while the data processing means is performing processing) is set for the data processing means, and when the amount of available memory is equal to or more than the optimum capacity, the memory allocation means allocates the optimum capacity to the data processing means.

When the optimum capacity is set for the data processing means that is to perform data processing but the amount of available memory is less than the optimum capacity and equal to or more than a guaranteed amount of memory as the sum of memory capacities necessary for processes executed by the individual processing means, the memory allocation means allocates the guaranteed amount of memory to the data processing means.

When the optimum capacity is not set for the data processing means that is to perform data processing and there is an amount of available memory enough to allocate memory equal to or more than the guaranteed amount of memory to the data processing means, the memory allocation means allocates, to the data processing means, an amount of memory defined according to the amount of available memory.

When the amount of available memory is less than the guaranteed amount of memory of the data processing means that is to perform data processing, the memory allocation means does not allocate memory to the data processing means. Instead, the memory allocation means determines whether memory usage when the data processing means performs processing is in the optimum state, and dynamically sets the optimum capacity based on the determination result.

The present invention is implemented to allocate memory to data processing means in a system including data processing means for performing a series of processing on data, and memory allocation means for allocating, to the data processing means, memory to be used for data processing. The data processing means includes input means for inputting data to be processed, one or multiple individual processing means for executing individual processes constituting the series of processing for the input data, output means for outputting data after being subjected to the series of processing, and buffer means used to pass data among the input means, the individual processing means, and the output means. The method includes the steps of: determining whether an optimum capacity is set for the data processing means that is to perform processing, where the optimum capacity is an amount of memory to realize an optimum state as a state in which data to be processed by all the individual processing means is held in the buffer means while the data processing means is performing processing; when the optimum capacity is set, allocating, to the data processing means that is to perform data processing, the optimum capacity or a guaranteed amount of memory as the sum of memory capacities, necessary for the processes executed by the individual processing means, according to the amount of available memory; and when the optimum capacity is not set, allocating, to the data processing means that is to perform data processing, an amount of memory equal to or more than the guaranteed amount of memory according to the amount of available memory, and setting the optimum capacity of the data processing means based on a state of memory usage when the data processing means performs processing.

Further, the present invention can be implemented as a computer program for controlling a computer to execute each of the above-mentioned functions of the system, or a computer program configured to be executed by the computer to perform methods, procedures, and processes corresponding to the respective steps in the above-mentioned method. This computer program can be provided by distributing it in the form of being stored on a physically tangible storage medium such as a magnetic disk or optical disk, a semiconductor memory, or any other physically tangible recording medium).

According to the present invention, memory can be used efficiently in a system for performing pipeline processing with pipes and filters, and the system performance can be improved.

Introduction of Guaranteed Memory Bandwidth and Optimum Capacity

In one embodiment, memory allocation to pipelines is controlled dynamically using the following two concepts: (i) the guaranteed memory bandwidth representing the minimum amount guaranteed for each individual pipeline, and (ii) the optimum state.

The guaranteed memory bandwidth is the minimum amount of memory (lower limit) to be allocated to each pipeline, and is defined for each individual pipeline. The guaranteed memory bandwidth in each pipeline is defined to be the sum of minimum memory capacities necessary for storing the input and output data of respective filters of all filters comprised by each pipeline. This capacity is calculated based on a ratio of memory used before and after each filter (hereinafter called guaranteed ratio). A method of ascertaining the guaranteed memory bandwidth will be described in detail later.

Since the guaranteed memory bandwidth is the minimum guaranteed amount of memory to be allocated to each pipeline, it is necessary to ensure the allocation of the guaranteed memory bandwidth defined for each pipeline upon execution of the pipeline. In other words, once it is confirmed that the guaranteed memory bandwidth can be secured for the pipeline, the pipeline can be executed. In addition, since the guaranteed memory bandwidth is the minimum guaranteed amount of memory to be allocated to each pipeline, if there is available memory, memory equal to or more than the guaranteed memory bandwidth can be allocated within an acceptable range.

When a pipeline is to be newly executed, if the available memory is insufficient for the guaranteed memory bandwidth of the pipeline to be executed, an amount of memory in excess of the guaranteed memory bandwidth of an active pipeline is released (to the pipeline to be executed) from the memory used by the active pipeline. Once the guaranteed memory bandwidth of the pipeline to be executed is ensured, the memory used by the pipeline to be executed is secured and the execution of the pipeline to be executed is started.

The optimum state of a pipeline is defined to be a state in which, when each of the filters forming the pipeline executes a process, data always exists in the memory (pipe) on the input side of the filter. Here, the time required for each filter to execute a process generally varies from filter to filter depending on the type of process even for the same amount of data. Therefore, it is not always true that the ratio of memory used before and after each filter in the optimum state (hereinafter called the optimum ratio) is the same as the guaranteed ratio used to calculate the guaranteed memory bandwidth. Even if the ratio values are the same, it is also not always true that the amounts of memory specifically allocated are the same.

If the state is this optimum state, since each filter can read input data to be processed immediately when executing a process specific to each filter, each filter can execute the process without going into a waiting state. In other words, even if memory equal to or more than the minimum amount of memory to realize the optimum state is allocated to one pipeline, it does nothing but increase unnecessary free space. Therefore, in one embodiment, after the minimum amount of memory (hereinafter called the optimum capacity) as the optimum state is determined for each pipeline, the optimum capacity is set as the upper limit of memory to be allocated to each pipeline. In other words, even when there is sufficient memory available for pipeline processing, memory greater than the optimum capacity of each pipeline is not allocated.

The time required for each filter to execute a process varies depending on the content of processing, the complexity and attributes of data to be processed, and the like. Therefore, the optimum state not only varies depending on the types and number of filters forming a pipeline, but also dynamically varies based on the types, amount, and attributes of data to be processed by each filter even in the same pipeline. Thus, it is desired to repeatedly determine and reset the optimum ratio of each filter and the optimum capacity of each pipeline based on a given condition (e.g., periodically or after a certain amount of data is processed). A method of ascertaining the optimum ratio and the optimum capacity will be described in detail later.

Thus, in one embodiment, the guaranteed memory bandwidth and the optimum capacity are set as the amount of memory to be allocated to each pipeline. Then, among the amounts of memory available for pipeline processing (i.e., memory to be allocated to the entire pipeline processing), the guaranteed memory bandwidth or the optimum capacity of a pipeline caused to perform processing is allocated to the pipeline. As mentioned above, the guaranteed memory bandwidth is a value fixed depending on the configuration (the types and number of filters) of the pipeline, whereas the optimum capacity is a dynamically varying value.

Functional Configuration of System

The functional configuration of a system for carrying out the embodiment is next described.

FIG. 1 is a diagram showing the functional configuration of a memory management, in accordance with embodiments of the present invention.

As shown in FIG. 1, the memory management system of the embodiment includes each pipeline (pipes and filters) 10, a memory controller 20, and a system memory management mechanism 30. The pipeline 10 performs, on data to be processed, a series of processing functions set by combining filters. The memory controller 20 controls the acquisition and releasing of memory in each pipeline 10. The system memory management mechanism 30 manages the memory used in the entire information processing system including the memory management system, and performs actual processing on the allocation and deallocation of memory areas.

The memory controller 20 makes a request to the system memory management mechanism 30 in order to control the acquisition and releasing of memory used in pipeline processing. In other words, the memory controller 20 and the system memory management mechanism 30 function as memory allocation means including actual memory allocation processing. Though not particularly shown, the information processing system including the memory management system shown in FIG. 1 further includes a system control section for controlling the execution of each pipeline 10. In other words, according to a start-up condition such as to accept a request from the outside, this system control section activates a corresponding pipeline 10 to perform processing.

Figure 2:
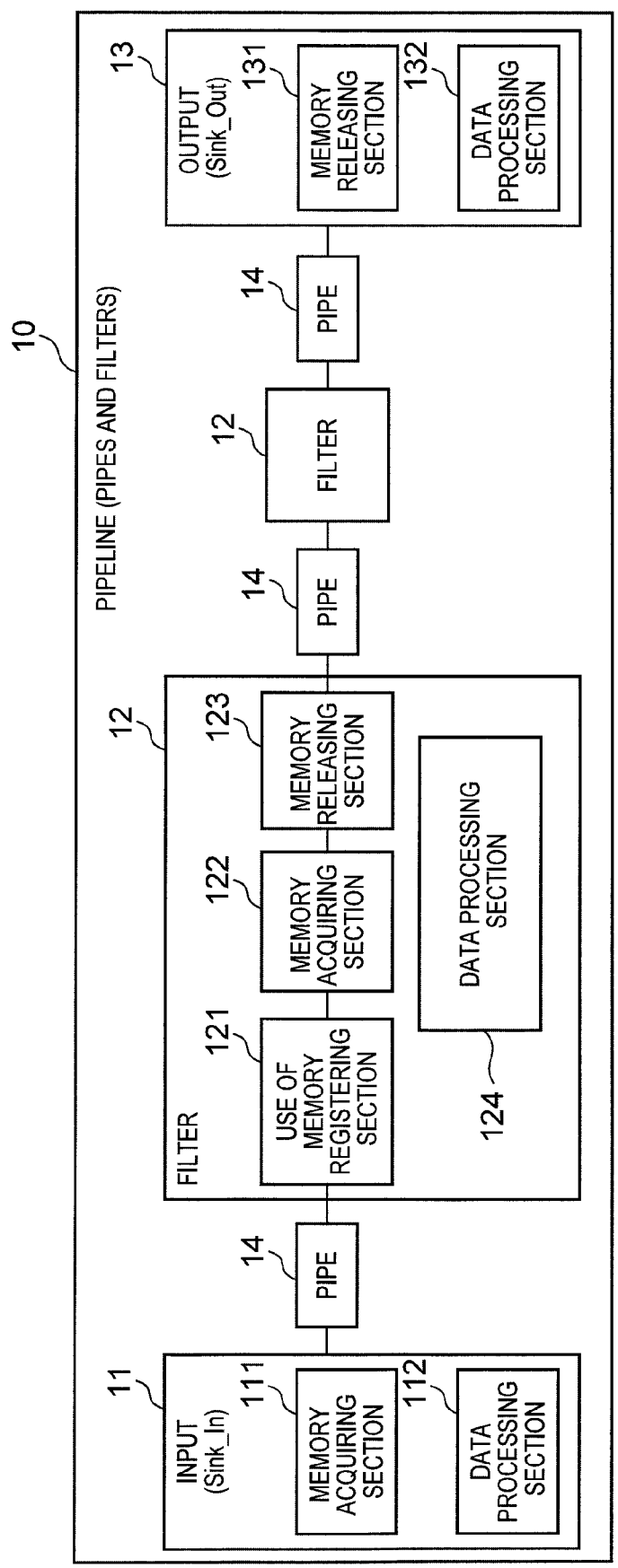
FIG. 2 is a block diagram showing the functional configuration of a pipeline, in accordance with embodiments of the present invention.

FIG. 2 is a block diagram showing the functional configuration of the pipeline 10 of FIG. 1, n accordance with embodiments of the present invention.

The pipeline 10 is data processing means, including one input (Sink In) 11, one or more filters 12, one output (Sink Out) 13, and pipes 14 connecting the input 11, the output 13, and respective filters 12.

The input 11 reads a file from a storage device or the like to acquire data to be processed in the pipeline 10. As shown in FIG. 2, the input 11 of the embodiment includes a memory acquiring section 111 and a data processing section 112.

The memory acquiring section 111 makes a request to the memory controller 20 to acquire memory to be used for passing data to the first filter 12 in the pipeline 10. This memory is used as a pipe 14 immediately following the input 11. The memory is acquired by using a memory token to be described later.

The data processing section 112 reads a file to acquire data to be processed. Then, the acquired data is sent to the immediately following pipe 14. Sending data to the pipe 14 means that data is output to the memory acquired by the memory acquiring section 111 (standard output). The data read by the input 11 is passed through the pipes 14 in units of data blocks (e.g., having a constant length) (block size). The data block size is set as appropriate according to the system specifications, the kind of data to be processed, and the like.

The filter 12 is individual processing means for executing an individual process on the data in the pipeline 10. As shown in FIG. 2, the filter 12 includes a use of memory registering section 121, a memory acquiring section 122, a memory releasing section 123, and a data processing section 124. In FIG. 2, the detailed functional configuration is shown for one filter 12 only, but each of the filters 12 forming the pipeline 10 has a similar functional configuration in reality.

The use of memory registering section 121 accesses the memory controller 20 to send information on use of memory in the filter 12. The information sent from the use of memory registering section 121 to the memory controller 20 is information specifically indicating whether data exists in the memory on the input side, whether available memory exists on the output side, and the like. As will be described in detail later, this information is used by the memory controller 20 to determine the optimum capacity.

The memory acquiring section 122 makes a request to the memory controller 20 to acquire memory to be used in the filter 12 (memory into which processed data is written). This memory is used as a pipe 14 immediately following the filter 12 that has acquired the memory. The memory is acquired by using a memory token to be described later in the same manner as that by the memory acquiring section 111 of the input 11. The memory acquiring section 122 receives data to be processed from the pipe 14 on the input side. Receiving data from the pipe 14 means that data output from a filter 12 immediately before the filter 12 or the input 11 to the memory is read (standard input).

The memory releasing section 123 makes a request to the memory controller 20 to release the memory on the input side (the memory into which data is read by the memory acquiring section 122). The memory is released by using a memory token to be described later in the same manner as in the case of the acquisition of memory.

The data processing section 124 processes the data received by the memory acquiring section 122. Then, data as the processing result is sent to the immediately following pipe 14. In other words, the data is output to the memory acquired by the memory acquiring section 122 (standard output).

The output 13 is to output the data processed by one or multiple filters 12 forming the pipeline 10 to a storage device or the like as a file. The output 13 includes a memory releasing section 131 and a data processing section 132.

The memory releasing section 131 makes a request to the memory controller 20 to release the memory used to pass data to the output 13. This memory is memory used as a pipe 14 between the last filter 12 in the pipeline 10 and the output 13. The memory is released by using a memory token to be described later in the same manner as in the case of the acquisition of memory.

The data processing section 132 receives the processed data from the immediately preceding pipe 14. In other words, among the filters 12 forming the pipeline 10, data output from the last filter 12 to the memory is read (standard input). Then, the read data is converted into a particular data format, and output as the processing result by the pipeline 10.

The pipe 14 is buffer means responsible for passing data between filters 12, between the input 11 and a filter 12, or between the filter 12 and the output 13. In other words, the pipe 14 holds data output from the preceding filter 12 or the input 11 (standard output). Then, the data held in the pipe 14 is read by the following filter 12 or the output 13 (standard input).

Figure 3:
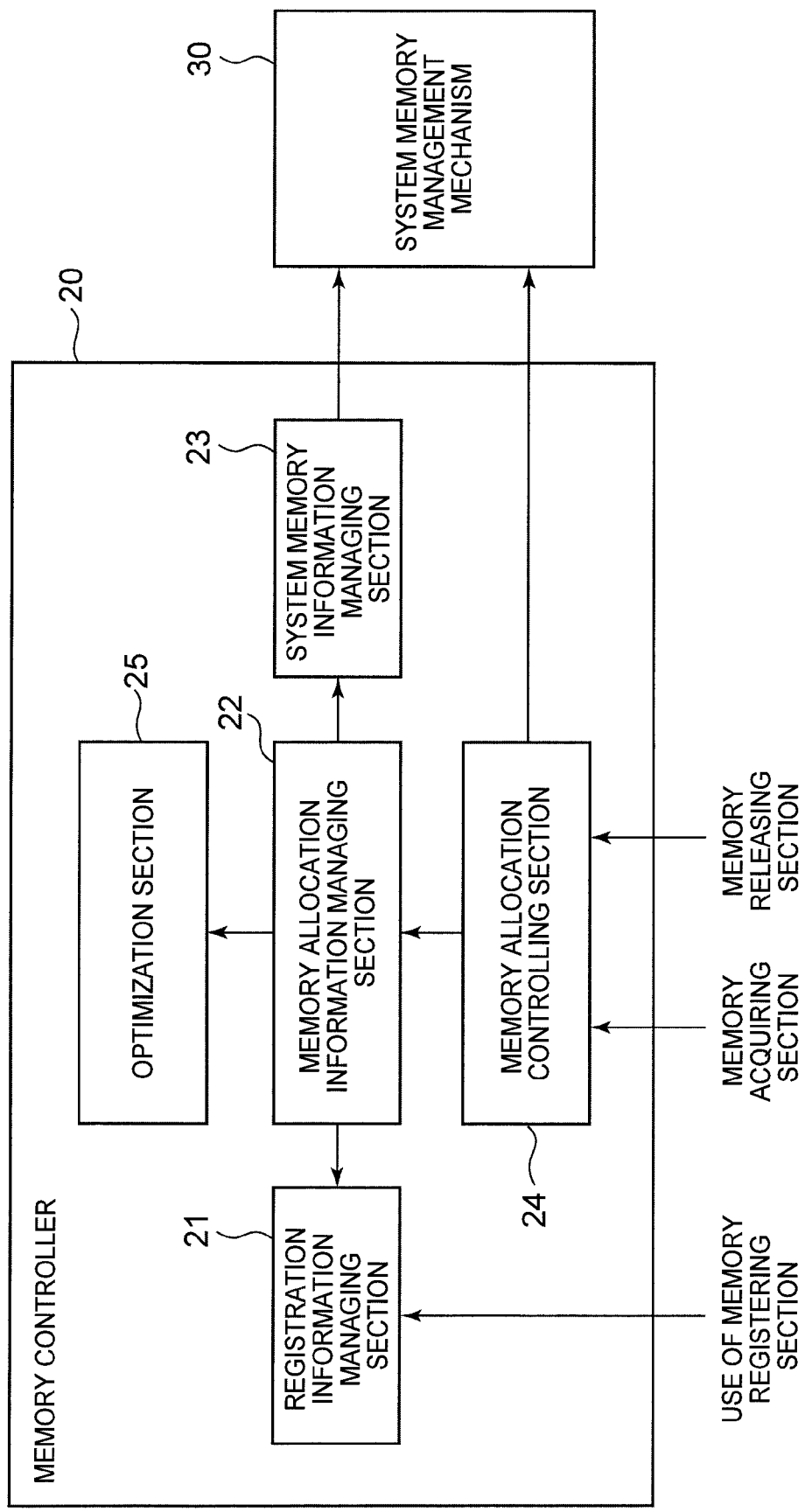
FIG. 3 is a block diagram showing the functional configuration of a memory controller, in accordance with embodiments of the present invention.

Thus in FIG. 2, the pipeline 10 comprises a sequence of filters along the pipeline 10. The sequence of filters begins with a first filter and ends with a last filter. Each filter is configured to execute a process specific to each filter. Each filter is configured to receive input data to enable execution by each filter of the process specific to each filter. Each filter generates output data resulting from execution by each filter of the process specific to each filter. The output data generated by each filter except the last filter is the input data of a next filter in the sequence of filters FIG. 3 is a block diagram showing the functional configuration of the memory controller 20 of FIG. 1, in accordance with embodiments of the present invention.

The memory controller 20 includes a registration information managing section 21, a memory allocation information managing section 22, a system memory information managing section 23, a memory allocation controlling section 24, and an optimization section 25.

The registration information managing section 21 registers and manages a guaranteed ratio for each filter 12 prepared in the system. This guaranteed ratio varies depending on the type of process to be executed by the filter 12. Specifically, in an example, the guaranteed ratio of a filter 12 that executes a process for converting one data block into four data blocks is 1:4. Similarly in an example, the guaranteed ratio of a filter 12 that executes a process for converting four data blocks into two data blocks is 4:2. The registration information managing section 21 acquires information on the guaranteed ratio of each filter 12 from use of the memory registering section 121 of the filter 12.

When the optimum ratio of the filter 12 is set, the registration information managing section 21 registers and manages this optimum ratio. This optimum ratio is reset according to a change in the optimum state of the pipeline 10. When the optimum ratio is changed, the registered content of the registration information managing section 21 is updated to the reset optimum ratio.

These pieces of information, which are used to issue a memory token to be described later, calculate the guaranteed memory bandwidth and the optimum capacity of the pipeline 10, and the like. Then, the registration information managing section 21 registers and manages the guaranteed memory bandwidth and the optimum capacity for each pipeline 10.

Further, the registration information managing section 21 issues the memory token to the memory acquiring section 111 of the input 11 and the memory acquiring section 122 of each filter 12 in the pipeline 10. Specifically, the registration information managing section 21 first acquires identification information (ID) from the use of memory registering section 121 of each filter 12. This identification information includes information for identifying each individual filter 12 and a pipeline 10 to which each filter 12 belongs. Next, the registration information managing section 21 associates registration information, managed with respect to the filter 12 identified by the acquired identification information, with the identification information to generate a memory token, and sends the memory token back to the filter 12 from which the identification information is sent.

Based on the guaranteed ratio of a filter 12 identified by the identification information on the first filter 12 in each pipeline 10, the registration information managing section 21 identifies memory capacity required on the input side of the filter 12 (i.e., on the output side of the input 11). Then, it associates the identification information on the pipeline 10 with the memory capacity to generate a memory token, and sends the memory token to the input 11 of the pipeline 10. As in the case of the filter 12, the identification information may be sent from the memory acquiring section 111 of the input 11 in each pipeline 10 to the registration information managing section 21 so that the memory token will be sent back from the registration information managing section 21 to the input 11.

The memory allocation information managing section 22 manages information on memory allocated to each filter 12 (i.e., being used by the filter 12). Specifically, information on the memory capacity or area acquired by the filter 12 using the memory token is managed. The information managed by the memory allocation information managing section 22 is updated each time the filter 12 acquires or releases memory. The same holds true with regard to the case where the input 11 acquires memory and the case where the output 13 releases the memory.

The system memory information managing section 23 manages information on the memory of the entire system. Specifically, information indicative of the memory usage in the entire system is managed. The memory used in pipeline processing is allocated and deallocated by the system memory management mechanism 30 under the control of the memory controller 20. Therefore, when a filter 12, the input 11, or the output 13 acquires or releases memory, the information in the system memory information managing section 23 is also updated.

Upon receipt of the memory token from the input 11, a filter 12, or the output 13 in the pipeline 10, the memory allocation controlling section 24 makes a request to the system memory management mechanism 30 to control the allocation and deallocation of memory in actual processing. Note that there is a case where necessary memory cannot be allocated because of insufficient available memory so that the filter 12 or the like will go into a waiting state even when the filter 12 or the like uses the memory token to make a request for acquiring memory. Such a waiting state is considered when the optimum capacity of the pipeline 10 is determined. The information on the presence of the waiting state is managed by the registration information managing section 21 as information on the state of available memory or the like.

The optimization section 25 calculates the optimum capacity of the input 11, a filter 12, or the output 13 in each pipeline 10. The calculated optimum capacity is registered in the registration information managing section 21, and considered when the memory allocation controlling section 24 allocates memory to the filter 12 or the like.

Method of Memory Allocation to Pipeline 10

Next, the method of memory allocation to a pipeline 10 will be described.

It is assumed that input 11 and the filters 12 in each pipeline 10 acquire a memory token from the registration information managing section 21 as the initial operation before starting processing of the pipeline 10.

When a pipeline 10 is to be executed, the basic ideas of allocating memory to the pipeline 10 are as follows:

A: When the optimum capacity is set for the pipeline 10,
 (1) the optimum capacity is allocated if possible,
 (2) the guaranteed memory bandwidth is allocated if the optimum capacity cannot be allocated (i.e., if the amount of available memory is less than the optimum capacity), or
 (3) if the guaranteed memory bandwidth cannot be allocated (i.e., if the amount of available memory is less than the guaranteed memory bandwidth), memory is released from any other pipeline 10 to which memory greater than the guaranteed memory bandwidth is allocated. If the guaranteed memory bandwidth is allocated to all pipelines 10 being executed, processing performed by any pipeline 10 is ended to wait until memory is released.

B: When no optimum capacity is set for the pipeline 10,
 (1) if memory equal to or more than the guaranteed memory bandwidth can be allocated, memory is allocated based on a predetermined rule (the guaranteed memory bandwidth is allocated at the very least), or
 (2) if the guaranteed memory bandwidth cannot be allocated (i.e., if the amount of available memory is less than the guaranteed memory bandwidth), memory is released from any other pipeline 10 to which memory greater than the guaranteed memory bandwidth is allocated. If the guaranteed memory bandwidth is allocated to all pipelines 10 being executed, processing performed by any pipeline 10 is ended to wait until memory is released.

Figure 4:
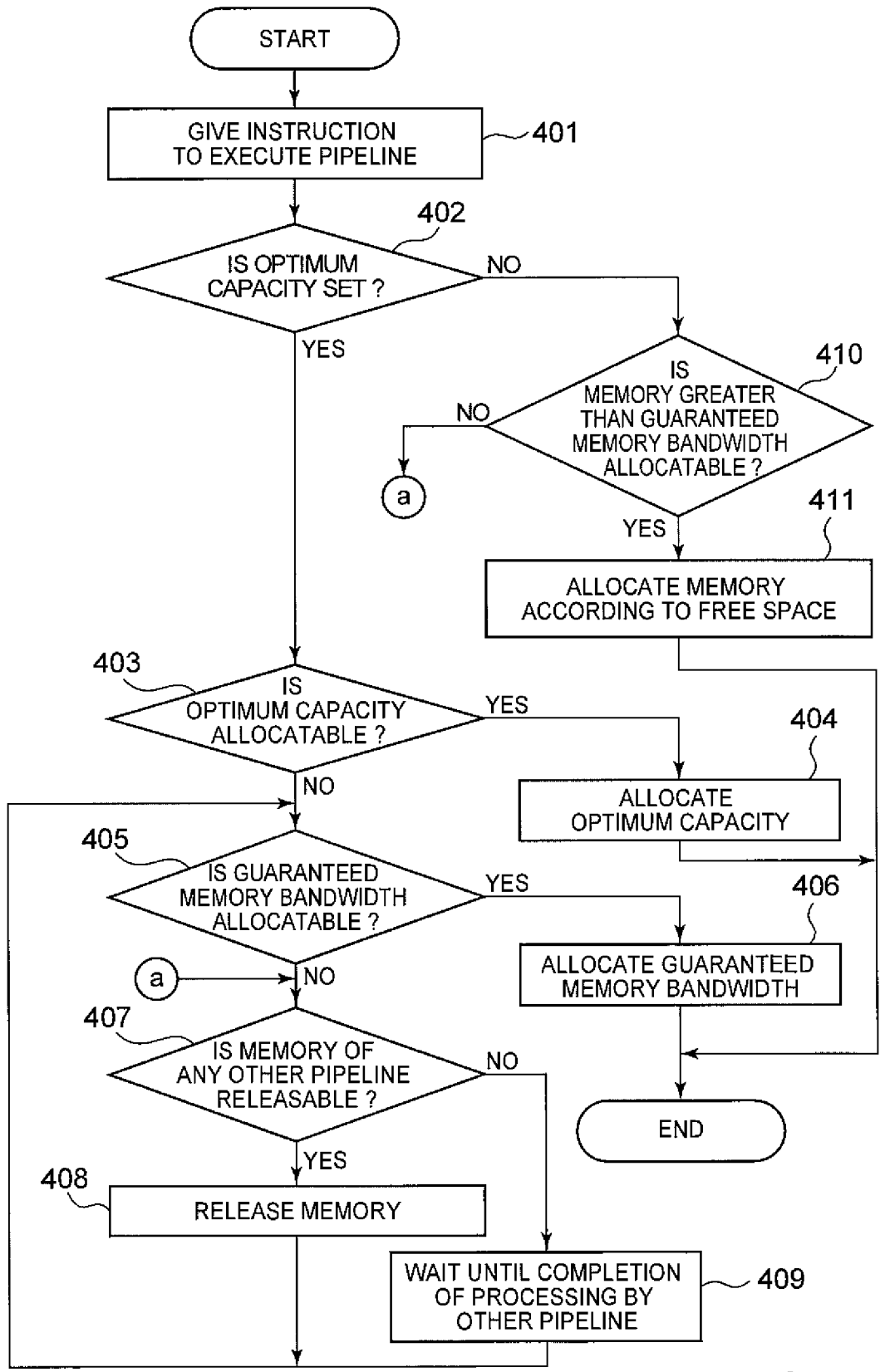
FIG. 4 is a flowchart showing a method of allocating memory to a pipeline, in accordance with embodiments of the present invention.

FIG. 4 is a flowchart showing a method of allocating memory to a certain pipeline 10, in accordance with embodiments of the present invention.

According to a predetermined start-up condition, when the system controller gives an instruction to execute the certain pipeline 10 (step 401), the memory allocation controlling section 24 of the memory controller 20 first determines whether the optimum capacity is set for the certain pipeline 10 (step 402). If the optimum capacity is set (YES branch of step 402), the memory allocation controlling section 24 then determines whether it is possible to allocate the optimum capacity to the certain pipeline 10 (step 403). Specifically, it is determined whether the amount of memory available for pipeline processing is equal to or more than the optimum capacity of the certain pipeline 10. If the optimum capacity can be allocated (YES branch of step 403), the memory allocation controlling section 24 allocates the optimum capacity to the certain pipeline 10 (step 404). Here, memory equal to or more than the optimum capacity is not allocated even if the amount of available memory is greater than the optimum capacity.

On the other hand, if the amount of available memory is less than the optimum capacity (NO branch of step 403), the memory allocation controlling section 24 then determines whether it is possible to allocate the guaranteed memory bandwidth to the certain pipeline 10 (step 405). Specifically, like in the case of the optimum capacity, it is determined whether the amount of available memory is equal to or more than the guaranteed memory bandwidth of the certain pipeline 10. If the guaranteed memory bandwidth can be allocated (YES branch of step 405), the memory allocation controlling section 24 allocates the guaranteed memory bandwidth to the certain pipeline 10 (step 406).

If the amount of available memory is less than the guaranteed memory bandwidth (NO branch of step 405), the memory allocation controlling section 24 then determines whether extra memory used by any other pipeline 10 can be released (step 407). Here, the case where the extra memory can be released from any other pipeline 10 is a case where memory greater than the guaranteed memory bandwidth is allocated to the other pipeline 10. The releasable extra memory comprised by the other pipeline 10 is in excess of the guaranteed memory bandwidth of the other pipeline 10 and is sufficient to enable the certain pipeline 10 to have at least the guaranteed memory bandwidth. In this case (YES branch of step 407), the memory allocation controlling section 24 releases the extra memory from the other pipeline 10 and allocates the released extra memory to the certain pipeline 10 (step 408). After that, the memory allocation controlling section 24 returns to step 405 to determine again whether the guaranteed memory bandwidth can be allocated to a pipeline 10 to be executed.

If there is no other pipeline 10 capable of releasing memory (i.e., if the guaranteed memory bandwidth is allocated to all the pipelines 10) (NO branch of step 407), the memory allocation controlling section 24 ends processing being performed by any pipeline 10 and waits until memory is released (step 409). Then, the procedure returns to step 405 to determine again whether the guaranteed memory bandwidth can be allocated to a pipeline 10 to be executed.

If the optimum capacity is not set for the pipeline 10 to be executed (NO branch of step 402), the memory allocation controlling section 24 next determines whether it is possible to allocate memory greater than the guaranteed memory bandwidth to the pipeline 10 (step 410). If the amount of available memory is not greater than the guaranteed memory bandwidth (NO branch of step 410), then step 405 determines whether the guaranteed memory bandwidth is allocatable to the pipeline 10. If the guaranteed memory bandwidth is allocatable to the pipeline 10 (YES branch of step 406), then step 406 allocates the guaranteed memory bandwidth to the pipeline 10. If the amount of available memory is less than the guaranteed memory bandwidth (NO branch of step 405), the memory allocation controlling section 24 determines whether memory used by any other pipeline 10 can be released (step 407). Then, after the memory is released from the other pipeline 10 (step 408) or the processing by the other pipeline 10 is completed and hence the memory is released (step 409), it is determined whether the guaranteed memory bandwidth can be allocated to the pipeline 10 to be executed (step 405).

On the other hand, if memory equal to or more than the guaranteed memory bandwidth can be allocated to the pipeline 10 (YES branch of step 410), the memory allocation controlling section 24 allocates memory to the pipeline 10 by a predetermined method (step 411). At this time, memory equal to or more than the guaranteed memory bandwidth may be allocated depending on the amount of available memory. The details of the memory allocation method in step 411 will be described later.

When the memory is thus allocated to the pipeline 10 and each filter 12 to execute a new pipeline 10, at least the guaranteed memory bandwidth is allocated. When there is no free space corresponding to the guaranteed memory bandwidth, if there is any other pipeline 10 operating with memory equal to or more than the guaranteed memory bandwidth allocated thereto, the other pipeline 10 is caused to release the memory and to operate with the guaranteed memory bandwidth, so that free space can be secured and allocated to the pipeline 10 to be newly executed. Thus, in the embodiment, the guaranteed memory bandwidth of each pipeline 10 is allocated to the pipeline 10 to enable as many pipelines 10 as possible to operate in parallel.

When the optimum capacity is set for the pipeline 10 to be newly executed and there is free space corresponding to the optimum capacity, the optimum capacity is allocated to the pipeline 10. This enables the pipeline 10 to operate efficiently without stopping the processing due to insufficient memory in any filter 12. In addition, since the optimum capacity is the minimum amount of memory to realize the optimum state, unnecessary memory is not allocated to the pipeline 10 wastefully. This enables more pipelines 10 to operate in parallel even when each pipeline 10 is operating in the optimum state.

Method of Ascertaining Guaranteed Memory Bandwidth

Next, a method of ascertaining the guaranteed memory bandwidth will be described in detail.

Figure 5:
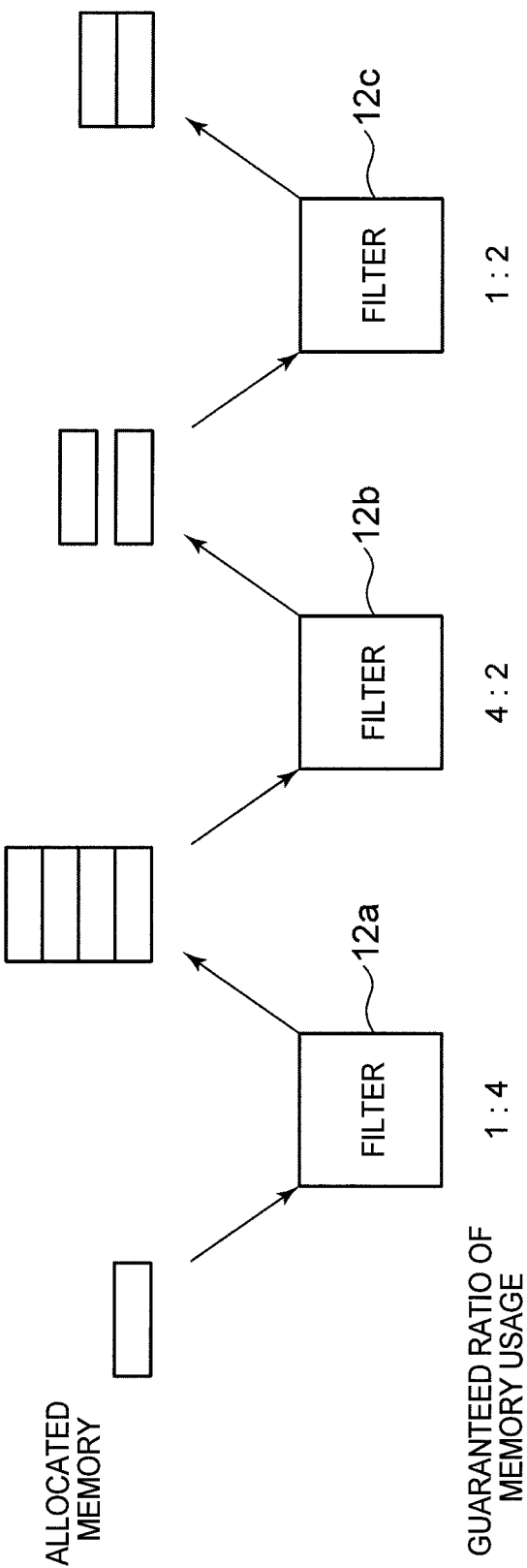
FIG. 5 is a diagram of an example for describing a method of ascertaining a guaranteed memory bandwidth, in accordance with embodiments of the present invention.

FIG. 5 is a diagram of an example for describing the method of ascertaining the guaranteed memory bandwidth, in accordance with embodiments of the present invention.

Shown in FIG. 5 are three filters 12 as part of a pipeline 10, and data on the input side and output side of each filter 12. In FIG. 5, the amount of data is represented by the number of data blocks. This is based on the fact that data is exchanged between filters 12 in the pipeline 10 in units of data blocks as mentioned above. In the following description, additional letters a to c are added as shown to distinguish among the three filters 12.

Referring to FIG. 5, the guaranteed ratio of memory usage between the input side and the output side of a filter 12a is 1:4. In other words, when a process is executed by the filter 12a, one data block of data is converted to four data blocks of data. Similarly, the guaranteed ratio of memory usage between the input side and the output side of a filter 12b is 4:2. In other words, when a process is executed by the filter 12b, four data blocks of data are converted to two data blocks of data. The guaranteed ratio of memory usage between the input side and the output side of a filter 12c is 1:2. In other words, when a process is executed by the filter 12c, one data block of data is converted to two data blocks of data.

In order to perform processing by a pipeline 10, it is necessary to secure at least an amount of memory enough for all the filters 12 forming the pipeline 10 to use. For example, if the filters 12 forming the pipeline 10 are the three filters 12a, 12b, and 12c shown in FIG. 5, memory allocated to each filter 12 is as follows. Memory corresponding to one data block of data is required on the input side of the filter 12a. Memory corresponding to four data blocks of data is required on the output side of the filter 12a (on the input side of the filter 12b). Memory corresponding to two data blocks of data is required on the output side of the filter 12b (on the input side of the filter 12c). Memory corresponding to two data blocks of data is required on the output side of the filter 12c.

Here, memory corresponding to one data block of data is enough for the input side of the filter 12c to execute the process. However, since it is necessary to ensure memory required for the output side of the filter 12b to send data to a pipe 14 between the filters 12b and 12c, memory corresponding to two data blocks of data is required. In other words, two data blocks of data are output from the filter 12b, and read into and processed by the filter 12c sequentially one data block by one data block. Therefore, memory at least corresponding to nine data blocks of data as shown is required for the entire pipeline 10.

Thus, the minimum amount of memory necessary for a pipeline 10 to perform processing, i.e., the guaranteed memory bandwidth, is the sum of memory capacities required by all the filters 12 forming the pipeline 10. Note that memory on the output side of a filter 12 is shared with the input side of the immediately following filter 12. If the amounts of memory are different between the output side of the preceding filter 12 and the input side of the following filter 12, the greater amount of memory will be selected.

The preceding example illustrates that the guaranteed memory bandwidth of a pipeline comprising a sequence of filters is computed as N1+D, wherein N1 is the numerator of the guaranteed ratio of the first filter (12*a*) and D is a sum of the denominators of the guaranteed ratio of all filters (12*a*, 12*b*, 12*c*) of the sequence of filters.

Optimum State and Optimum Capacity

Next, the optimum state and the optimum capacity will be described.

Since the above-mentioned guaranteed memory bandwidth is the minimum amount of memory available for a pipeline 10, if there is a sufficient amount of available memory, memory greater than the guaranteed memory bandwidth can be allocated to the pipeline 10. When memory corresponding to the guaranteed memory bandwidth is allocated to the pipeline 10, the pipeline 10 can perform processing, but it does not mean that the pipeline 10 can always operate efficiently. For example, it may take a long time for a specific filter 12 among the filters 12 forming a pipeline 10 to execute a process so that the immediately following filter 12 cannot perform processing and hence has to wait for input (i.e., it goes into the state of waiting until data processed by the specific filter 12 is output to the pipe 14). Therefore, if there is sufficient memory, it is desirable to allocate more memory to each pipeline 10. As a result of allocating more memory to the pipeline 10, if the optimum state where data always exists in memory on the input side of each filter 12 can be realized, and high performance in processing by the pipeline 10 can be obtained.

On the other hand, even if memory greater than the amount of memory corresponding to the entire processing power of the pipeline 10 is allocated, the amount of available memory just increases without improving the processing efficiency, even though the optimum state is obtained. When more memory is allocated unevenly to a specific filter 12 among multiple filters 12 forming a pipeline 10, a group of following filters 12 cannot keep up with the processing. This causes data to get stacked up in the memory greatly allocated on the output side of the specific filter 12, resulting in deterioration of the improvement in processing efficiency.

Therefore, in one embodiment, the minimum amount of memory to realize the optimum state is set as the optimum capacity of each pipeline 10, setting it as the upper limit of the amount of memory to be allocated to the pipeline 10. Then, in one embodiment, each pipeline 10 is made operable as long as memory corresponding to the guaranteed memory bandwidth can be allocated, and when there is sufficient memory, memory corresponding to the optimum capacity is allocated.

In one pipeline 10, the optimum ratio of each filter 12 to realize the optimum state may vary depending on the conditions, such as the complexity and attributes of data to be processed (for example, when the pipeline 10 performs image processing, the conditions are the resolution of and the number of colors in an image (data to be processed). Therefore, after an optimum capacity corresponding to a specific condition is decided, the optimum state may not be maintained due to a change in the processing conditions for the same pipeline 10. In such a case, an optimum ratio corresponding to a new condition is determined to decide on the optimum capacity again. In other words, the optimum capacity is dynamically decided by learning to realize the optimum state in specific processing by an actual pipeline 10. Further, if one pipeline 10 performs processing based on multiple different conditions, multiple optimum capacities may be decided according to the respective conditions.

After the optimum capacity of a pipeline 10 is decided, if the optimum state cannot be maintained in the pipeline 10, memory will be allocated as if the optimum capacity was not set for the pipeline 10 until a new optimum capacity is decided (NO is determined in step 402 of FIG. 4).

Method of Ascertaining Optimum Capacity

Next, methods of ascertaining the optimum capacity will be described.

In the embodiment, two kinds of decision procedures, a smoothing procedure and an addition procedure, will be described as specific examples of ascertaining the optimum capacity. The smoothing procedure determines the minimum amount of memory to maintain the optimum state by reducing the amount of memory allocation sequentially after more memory is first allocated and hence the optimum state is obtained. The addition procedure determines a memory capacity capable of obtaining the optimum state by increasing the amount of memory allocation sequentially from the guaranteed memory bandwidth.

(1) Smoothing Procedure

Figure 6:
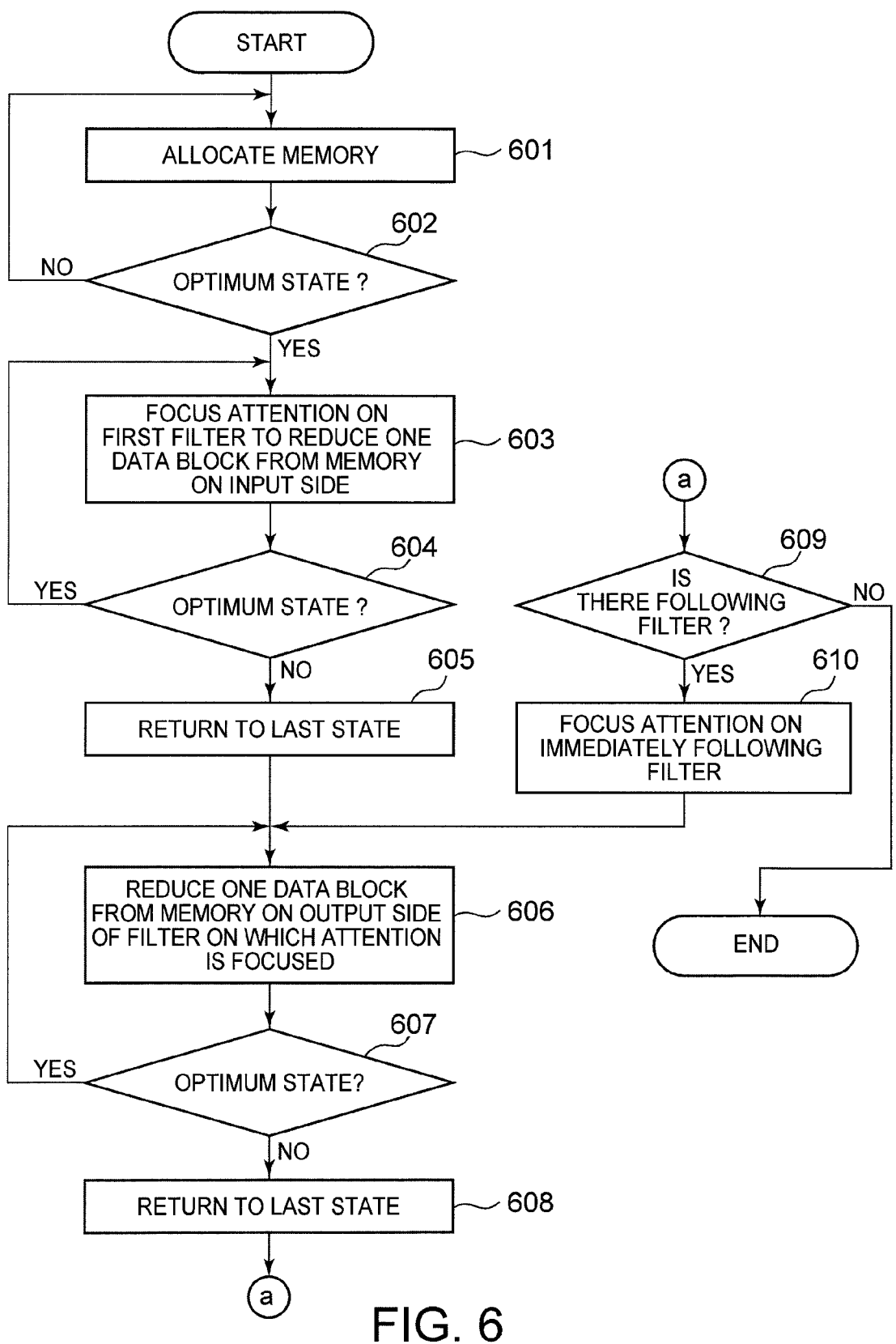
FIG. 6 is a flowchart defining the smoothing procedure for ascertaining an optimum capacity, in accordance with embodiments of the present invention.

FIG. 6 is a flowchart defining the smoothing procedure for ascertaining the optimum memory capacity, in accordance with embodiments of the present invention.

In the smoothing procedure, upon execution of a pipeline 10, if there is available memory greater than the guaranteed memory bandwidth of the pipeline 10, the memory allocation controller 24 first allocates memory greater than the guaranteed memory bandwidth based on a predetermined condition (step 601). Here, the condition for allocating memory is set, for example, as three times the guaranteed memory bandwidth or the like to allow sufficiently for realizing the optimum state. As for memory allocation to each of the filters 12 forming the pipeline 10, such a condition that three times the memory capacity on the output side is set as the upper limit based, for example, on the guaranteed ratio of each filter 12 so as not to place weight on a specific filter 12.

Specifically, for example, in the case of the pipeline 10 shown in FIG. 5, 27 data blocks of memory can be allocated to the entire pipeline 10. Then, the memory can be allocated as follows: three data blocks on the input side of the filter 12*a*, twelve data blocks on the output side, six data blocks on the output side of the filter 12*b*, and six data blocks on the output side of the filter 12*c*. The values of these allocation conditions are just illustrative examples. Actually, they are set individually according to the processing content, the size and complexity of data, and the like. For example, if the optimum state cannot be realized simply by allocating memory corresponding to three times the guaranteed memory bandwidth, such a condition (that memory capacity equal to or more than four times the guaranteed memory bandwidth is allocated) may be set.

If there is no available memory enough to satisfy the set condition, the memory allocation controller 24 can allocate memory corresponding to the free space. Then, when available memory is created, the memory allocation controller 24 will additionally allocate memory until the set condition is satisfied. Alternatively, the memory allocation information managing section 22 may determine whether the optimum state is realized by the allocated memory, and if the optimum state is realized, control by the memory allocation controller 24 will shift to the next smoothing step. If the memory allocated to the pipeline 10 does not satisfy the set condition, it can be predefined as to which filter 12 among the filters 12 memory should be preferentially allocated. For example, more memory is preferentially allocated to the input side of a filter 12 requiring long time to execute the process, and this makes it easy to avoid stopping processing by the entire pipeline 10 because the immediately preceding filter 12 cannot output the processed data.

If the optimum state is realized in the above-mentioned initial step (YES in step 602), then the memory allocation controller 24 sequentially reduces the amount of allocated memory based on a given rule. The rule for reducing the amount of allocated memory can be defined appropriately. As an example, the flowchart of FIG. 6 shows a procedure for reducing the amount of memory in due order from memory corresponding to the first pipe 14 in the pipeline 10 (i.e., memory on the input side of the first filter 12 (on the outside of the input 11)).

Referring to FIG. 6, the memory allocation controller 24 first reduces one data block from memory allocated to the input side of the first filter 12 (step 603). Then, the memory allocation information managing section 22 determines whether the optimum state is maintained (step 604). If the optimum state is maintained, the memory allocation controller 24 further reduces one data block from the memory allocated to the input side of the first filter 12 (step 603). Steps 603 and 604 are repeated, and once the memory allocation goes out of the optimum state, the memory allocation controller 24 returns the memory allocation to the last state (i.e., the last state in which the optimum state was maintained) (step 605).

In actual processing, however, the optimum state of some of the filters 12 in the pipeline 10 may be temporarily disrupted due to the amount of data to be processed or execution timing even if an amount of memory enough to realize the optimum state is allocated. In the embodiment, such temporary disruption is treated as state fluctuation and the optimum state is regarded as being maintained. Specifically, for example, the memory allocation information managing section 22 monitors the memory usage in each filter 12 for a given length of time, and the optimum state is regarded as being maintained unless the waiting state in which data cannot be read because of no data in memory on the input side exceeds a predetermined value for the upper limit (e.g., 500 milliseconds). Alternatively, the optimum state may be regarded as being maintained unless a value for the cumulative period of time during which no data exists in memory on the input side in the memory usage pattern for a given length of time exceeds a fixed percentage (e.g., 10%).

Next, the memory allocation controller 24 reduces one data block from the memory allocated to the output side of the first filter 12 (step 606). Then, the memory allocation information managing section 22 determines whether the optimum state is maintained (step 607). If the optimum state is maintained, the memory allocation controller 24 further reduces one data block from the memory allocated to the output side of the first filter 12 (step 606). Steps 606 and 607 are repeated, and once the memory allocation goes out of the optimum state, the memory allocation controller 24 returns the memory allocation to the last state (i.e., the last state in which the optimum state was maintained) (step 608).

Next, the memory allocation controller 24 checks whether any filter 12 exists downstream of a filter 12 (the first filter 12 here) on which attention is focused as a target to execute the process in the pipeline 10 (step 609). If any filter 12 exists downstream thereof, the memory allocation controller 24 focuses attention on the immediately following filter 12 (step 610), and reduces one data block from the memory allocated to the output side of the filter 12 on which attention is focused (step 606). The operations from step 606 to step 610 are repeated for all the filters 12. Then, if there is no filter 12 downstream of the filter 12 on which attention is focused (i.e., when the processes by all the filters 12 are completed), the smoothing step is ended. At this time, the memory allocated to the pipeline 10 is the minimum amount of memory to obtain the optimum state. Thus, the optimum capacity of the pipeline 10 is decided through the above-mentioned operations.

In the example operation shown in FIG. 6, the capacity to be allocated in order from memory corresponding to the first pipe 14 of the pipeline 10 is reduced, but the order of reducing memory is not limited to the above example operation. In the embodiment, it is only necessary to reduce the amount of memory allocation as much as possible while maintaining the optimum state, and the filter 12 from which memory allocation is to be reduced can also be specified by another procedure.

FIG. 7, which encompasses FIGS. 7A-7D, is a diagram showing a situation in which the optimum memory capacity is decided by the smoothing procedure by taking the pipeline 10 shown in FIG. 5 as an example, in accordance with embodiments of the present invention.

Figure 7A:
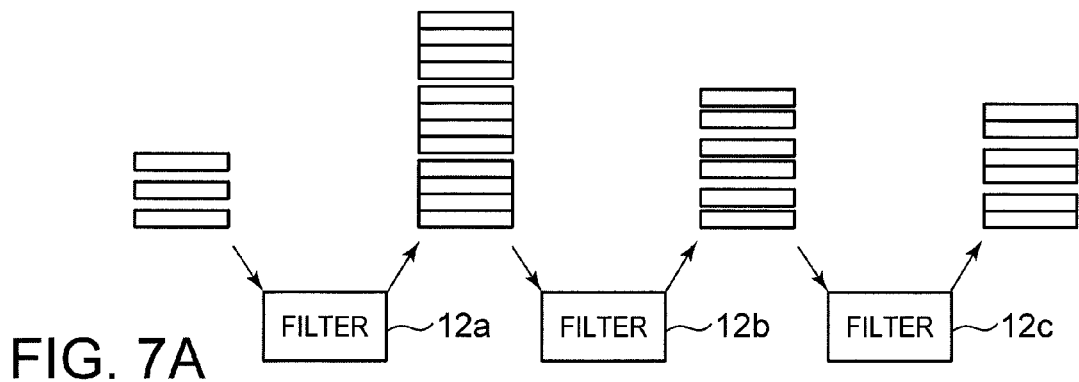
FIG. 7 is a diagram applying the smoothing procedure for ascertaining the optimum capacity by taking the pipeline shown in FIG. 5 as an example, in accordance with embodiments of the present invention.

Referring to FIG. 7A, the memory three times the guaranteed memory bandwidth shown in FIG. 5 is allocated to the input side of the filter 12a and the output side of each of the filters 12a, 12b, and 12c in this pipeline 10. It is assumed that the optimum state is obtained in this state (i.e., YES in step 602 of FIG. 6).

Figure 7B:
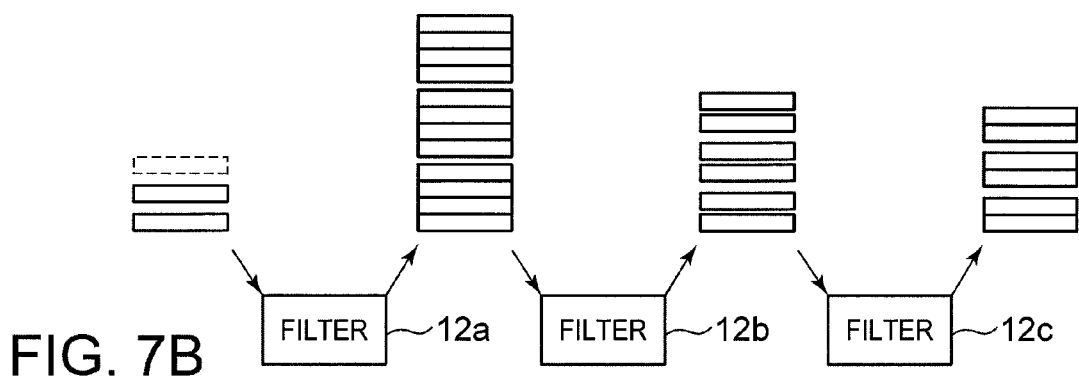
Figure 7C:
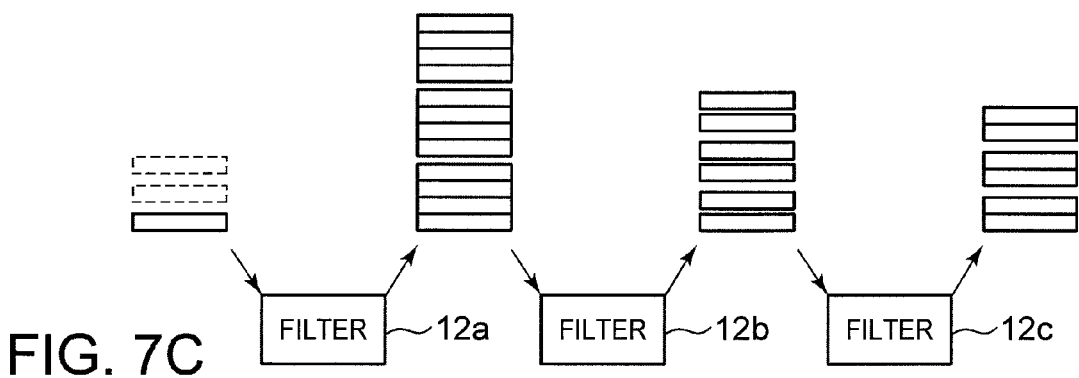

Referring next to FIG. 7B, one data block of memory is reduced from the amount of memory allocated to the input side of the filter 12a. As shown, the reduced amount of memory is indicated by the broken line. It is assumed that the optimum state is obtained in this state (i.e., YES in step 604 of FIG. 6). Referring to FIG. 7C, one data block of memory is further reduced from the amount of memory allocated to the input side of the filter 12a. Since the remaining amount of memory allocated to the input side of the filter 12a is one data block, the memory cannot be reduced any more. Therefore, in FIG. 7D below, the memory allocated to the output side of the filter 12a is reduced. After that, the memory on the output side of the filter 12a, the memory on the output side of the filter 12b, and the memory on the output side of the filter 12c are reduced in due order in like fashion while confirming that the optimum state is maintained.

Figure 7D:
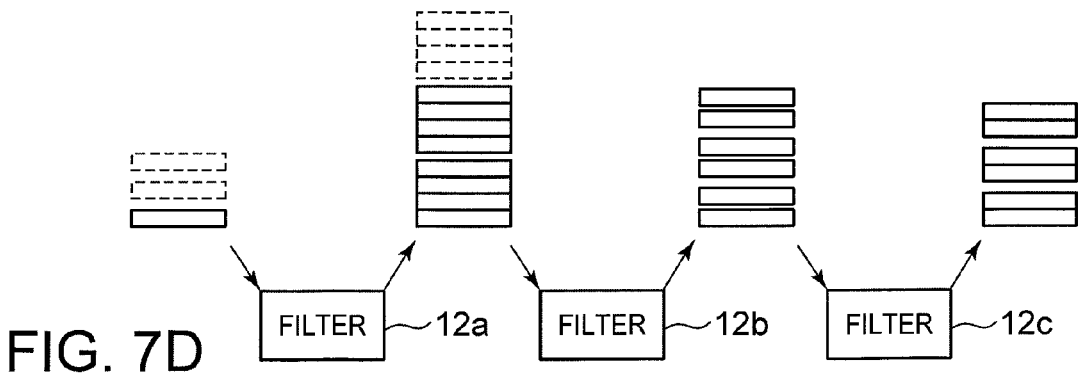

Note that FIG. 7D shows a state where four data blocks of memory are reduced from the amount of memory on the output side of the filter 12a. This is because the guaranteed ratio of the filter 12a is 1:4 (see FIG. 5) and when four data blocks of memory are increased or reduced, the question of whether the optimum state is maintained or not becomes an issue. In other words, when memory is reduced according to the procedure shown in FIG. 6, the operations of steps 606 and 607 are performed over four cycles to make the transition from the state in FIG. 7C to the state in FIG. 7D.

(2) Addition Procedure

Figure 8:
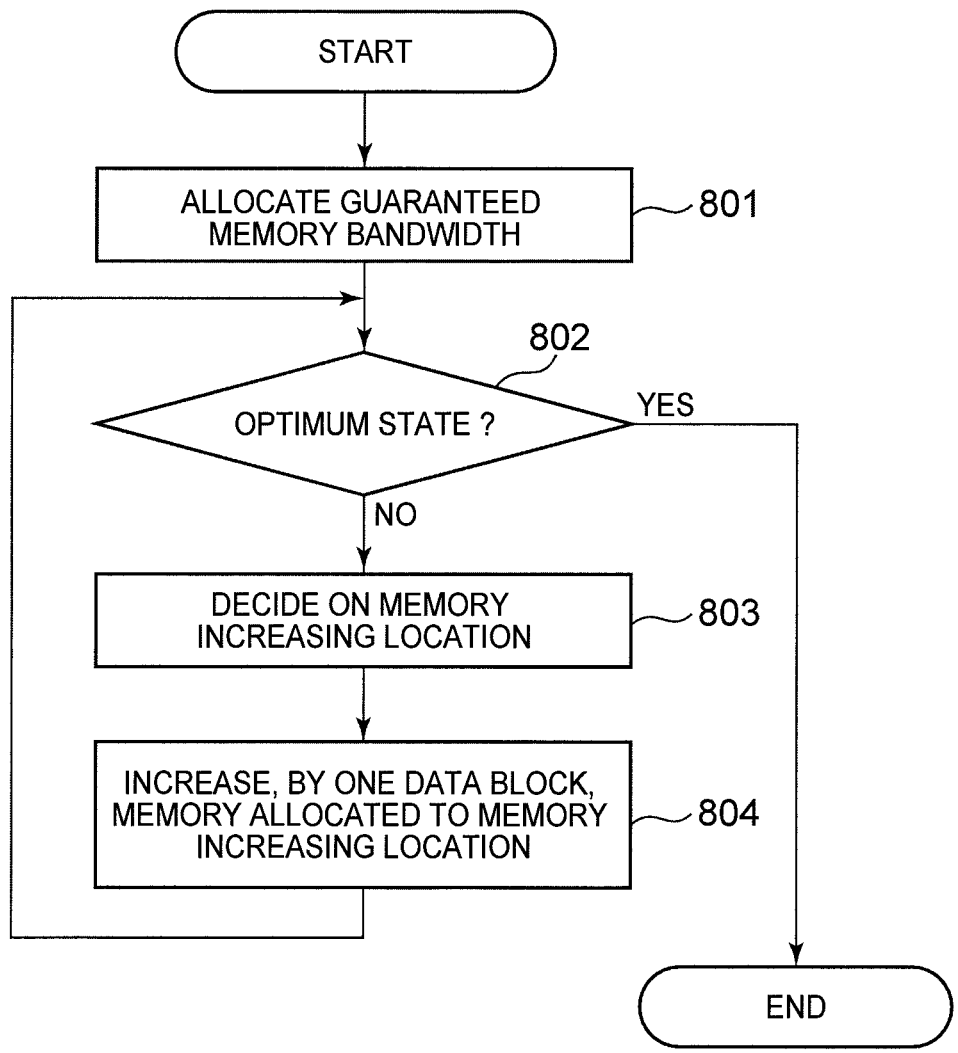
FIG. 8 is a flowchart defining the addition procedure for ascertaining the optimum capacity, in accordance with embodiments of the present invention.

FIG. 8 is a flowchart defining the addition procedure for ascertaining the optimum memory capacity, in accordance with embodiments of the present invention.

In the addition procedure, upon execution of a pipeline 10, if there is available memory greater than the guaranteed memory bandwidth of the pipeline 10, the memory allocation controller 24 first allocates memory greater than the guaranteed memory bandwidth of the pipeline 10 (step 801). Then, the memory allocation information managing section 22 determines whether the optimum state is realized (step 802). In the determination as to whether the optimum state, state fluctuation is considered as mentioned in the above description of the smoothing procedure (see FIG. 6). In other words, when the frequency of occurrence of the waiting state that disrupts the optimized state is equal to or less than certain counts, it is determined that the optimized state is realized.

If the state is not the optimum state, the memory allocation controller 24 identifies a filter 12 which is kept waiting to execute the process, and decides on a location at which the amount of memory allocation is increased (hereinafter, memory increasing location) (step 803). Here, various methods can be employed as the method of ascertaining the memory increasing location. For example, the memory increasing location can be decided as follows.

It is assumed that, when one filter 12 executes a process, the filter 12 cannot read data because of absence of data on the input side of memory and waits for output of data from the immediately preceding filter 12 (wait for output). It is also assumed that, when one filter 12 tries to output processed data, the filter 12 cannot output the data because of no available memory on the output side and waits for a state where the immediately following filter 12 finishes data reading and hence output of data to the memory becomes possible (wait for reading). Then, in regard to memory corresponding to a pipe 14, when the immediately following filter 12 waits for output and the immediately preceding filter 12 waits for reading, the pipe 14 is decided on as the memory increasing location.

Next, the memory allocation controller 24 increases, by one data block, the memory allocated to the memory increasing location decided in step 803 (step 804). Then, the memory allocation information managing section 22 determines whether the optimum state is realized (step 802). The operations from step 802 to step 804 are repeated, and if the problem with locations, at which both the state of waiting for output and the state of waiting for reading are created, is solved throughout the pipeline 10 and hence the optimum state is realized, the processing performed by the memory allocation controller 24 is ended. At this time, the amount of memory allocated to the pipeline 10 is the minimum amount of memory capable of obtaining the optimum state. Thus, according to the above operations, the optimum capacity of the pipeline 10 is decided.

Here, the method of deciding on ascertaining the memory increasing location will further be described.

In actual processing, some of the filters 12 in a pipeline 10 may be temporarily kept waiting to output or read due to the amount of data to be processed or execution timing even if the optimum capacity is allocated. Therefore, for example, a case can be considered where the memory allocation information managing section 22 monitors the memory usage in each filter 12 for a given length of time, and if the probability of being kept waiting to output at the time of data output and the probability of being kept waiting to read at the time of data reading are equal to or more than certain percentage (e.g., 40% or more), the corresponding location is treated as the memory increasing location. This can avoid becoming sensitive to the case of being temporarily kept waiting to output or waiting to read due to changes in various conditions upon performing data processing, i.e., becoming sensitive to so-called state fluctuation.

Note that the above-mentioned method of ascertaining the memory increasing location is just an illustrative example. In the embodiment, it is only necessary to increase the amount of memory to be allocated to any of the filters 12 sequentially from the guaranteed memory bandwidth until the optimum state is obtained, and the memory increasing location can also be decided by another procedure.

Example of Hardware Configuration

Finally, the hardware configuration of a computer suitable for implementing an information processing system including the memory management system of the embodiment will be described.

Figure 9:
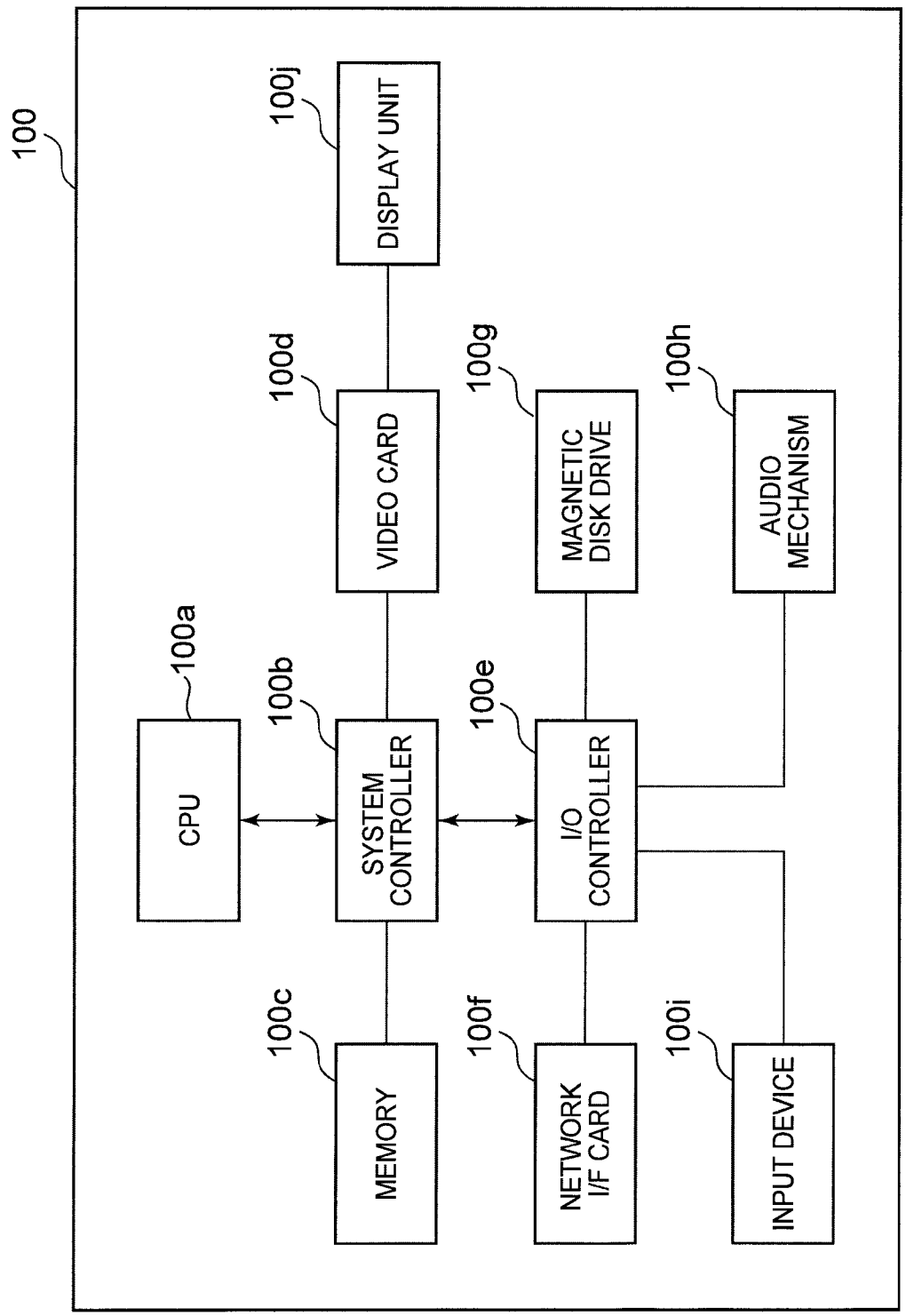
FIG. 9 is a diagram showing an example of the hardware configuration of a computer suitable for implementing the memory management system of the present invention.

FIG. 9 is a diagram showing an example of the hardware configuration of such a computer, in accordance with embodiments of the present invention.

A computer 100 shown in FIG. 9 includes a CPU (Central Processing Unit) 100a as computing means and a physically tangible memory 100c as main storage means. The computer 100 also includes, as external devices, a physically tangible storage device such as a magnetic disk drive (HDD: Hard Disk Drive) 100g, a network interface card 100f, a video card 100d, and a display unit 100j, an audio mechanism 100h, and input devices 100i such as a keyboard and a mouse.

In the configuration example shown in FIG. 9, the memory 100c and the video card 100d are connected to the CPU 100a through a system controller 100b. The network interface card 100f, the magnetic disk drive 100g, the audio mechanism 100h, and the input devices 100i are connected to the system controller 100b through an I/O controller 100e. The components are connected to one another through various buses such as a system bus and an input/output bus. Note that FIG. 9 just shows an illustrative example of the hardware configuration of the computer to which the embodiment is suitably applied. The embodiment is applicable to a wide variety of information processing systems for performing pipeline processing with pipes and filters, and the implementation of the embodiment is not limited only to the configuration as shown. For example, since pipeline processing is often used in an embedded device, such as a display unit or a printer for streaming images, the embodiment can also be applied to a computer as such an embedded device.

In FIG. 9, programs such as OS and application software are stored in the magnetic disk drive 100g. These programs are read into the memory 100c and executed by the CPU 100a to implement various functions of the methods and procedures of the present invention, including each of the functions of the input 11, the filter 12, and the output 13 of each pipeline 10, the memory controller 20, and the system memory management mechanism 30 shown in FIG. 1.

Thus, a computer program product of the present invention comprises a physically tangible storage device such as the magnetic disk drive 100g. The storage device stores program code that, upon being executed by the processor 100a of the computer 100, implements the methods and procedures of the present invention.

Accordingly, a computer system of the present invention comprises the computer 100 and thus comprises the processor 100a and a physically tangible storage device such as the magnetic disk drive 100g. As stated supra, the storage device stores computer readable program code that, upon being executed by the processor 100a of the computer 100, implements the methods and procedures of the present invention.

In FIG. 9, the configuration example of one computer is shown, but in an actual system, the pipelines 10, the memory controller 20, and the system memory management mechanism 30 may be configured individually by two or more computers. Respective filters 12 in a pipeline 10 may also be configured by using two or more computers. When the information processing system of the embodiment is realized by two or more computers, a server computer having the function of the memory controller 20 may be prepared to centrally control the management and allocation of memory.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for allocating memory to a first pipeline, said method comprising:

ascertaining, by a processor of a computer system, whether an optimum memory capacity can be allocated to a first pipeline that comprises a sequence of filters, wherein each filter is configured to execute a process specific to each filter, receive input data to enable execution of the process, and generate output data resulting from execution of the process, and wherein the output data generated by each filter except the last filter in the sequence is the input data to a next filter in the sequence;

if said ascertaining whether the optimum memory capacity can be allocated to the first pipeline ascertains that the optimum memory capacity can be allocated to the first pipeline, then said processor allocating the optimum memory capacity to the first pipeline, else said processor ascertaining whether a guaranteed memory bandwidth can be allocated to the first pipeline;

if said ascertaining whether the guaranteed memory bandwidth can be allocated to the first pipeline ascertains that the guaranteed memory bandwidth can be allocated to the first pipeline, then said processor allocating the guaranteed memory bandwidth to the first pipeline, else said processor currently releasing extra memory from a second pipeline if the second pipeline is not currently performing processing or subsequently releasing the extra memory from the second pipeline when the second pipeline subsequently completes performing processing that is currently being performed, followed by said processor allocating the extra memory to the first pipeline.

2. The method of claim 1, wherein said ascertaining whether the optimum memory capacity can be allocated to the first pipeline ascertains that the optimum memory capacity can be allocated to the first pipeline.

3. The method of claim 1, wherein said ascertaining whether the optimum memory capacity can be allocated to the first pipeline ascertains that the optimum memory capacity cannot be allocated to the first pipeline, and wherein said ascertaining whether the guaranteed memory bandwidth can be allocated to the first pipeline ascertains that the guaranteed memory bandwidth can be allocated to the first pipeline.

4. The method of claim 1, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory can be currently released.

5. The method of claim 1, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory cannot be currently released.

6. The method of claim 1, wherein said ascertaining whether the optimum memory capacity can be allocated to the first pipeline ascertains that the optimum memory capacity cannot be allocated to the first pipeline, wherein each filter is characterized by a guaranteed ratio of memory usage expressed as a ratio of a numerator to a denominator such that each ratio is specific to each filter, and wherein the method further comprises:

prior to said ascertaining whether the guaranteed memory bandwidth can be allocated to the first pipeline, computing the guaranteed memory bandwidth of the first pipeline as N1+D, wherein N1 is the numerator of the guaranteed ratio of the first filter in the sequence of filters and D is a sum of the denominators of the guaranteed ratio of all filters in the sequence of filters.

7. The method of claim 1, wherein the method further comprises:

prior to said ascertaining whether the optimum memory capacity can be allocated to the first pipeline, ascertaining the optimum memory capacity of the first pipeline by performing the smoothing procedure.

8. The method of claim 1, wherein the method further comprises:

prior to said ascertaining whether the optimum memory capacity can be allocated to the first pipeline, ascertaining the optimum memory capacity of the first pipeline by performing the addition procedure.

9. A computer program product, comprising a computer readable physically tangible storage device that is not a signal medium having program code stored therein, said program code configured to be executed by a processor of a computer to implement a method for allocating memory to a first pipeline, said method comprising:

ascertaining whether an optimum memory capacity can be allocated to a first pipeline that comprises a sequence of filters, wherein each filter is configured to execute a process specific to each filter, receive input data to enable execution of the process, and generate output data resulting from execution of the process, and wherein the output data generated by each filter except the last filter in the sequence is the input data to a next filter in the sequence;

if said ascertaining whether the optimum memory capacity can be allocated to the first pipeline ascertains that the optimum memory capacity can be allocated to the first pipeline, then allocating the optimum memory capacity to the first pipeline, else ascertaining whether a guaranteed memory bandwidth can be allocated to the first pipeline;

if said ascertaining whether the guaranteed memory bandwidth can be allocated to the first pipeline ascertains that the guaranteed memory bandwidth can be allocated to the first pipeline, then allocating the guaranteed memory bandwidth to the first pipeline, else currently releasing extra memory from a second pipeline if the second pipeline is not currently performing processing or subsequently releasing the extra memory from the second pipeline when the second pipeline subsequently completes performing processing that is currently being performed, followed by allocating the extra memory to the first pipeline.

10. The computer program product of claim 9, wherein said ascertaining whether the optimum memory capacity can be allocated to the first pipeline ascertains that the optimum memory capacity can be allocated to the first pipeline.

11. The computer program product of claim 9, wherein said ascertaining whether the optimum memory capacity can be allocated to the first pipeline ascertains that the optimum memory capacity cannot be allocated to the first pipeline, and wherein said ascertaining whether the guaranteed memory bandwidth can be allocated to the first pipeline ascertains that the guaranteed memory bandwidth can be allocated to the first pipeline.

12. The computer program product of claim 9, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory can be currently released.

13. The computer program product of claim 9, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory cannot be currently released.

14. The computer program product of claim 9, wherein said ascertaining whether the optimum memory capacity can be allocated to the first pipeline ascertains that the optimum memory capacity cannot be allocated to the first pipeline, wherein each filter is characterized by a guaranteed ratio of memory usage expressed as a ratio of a numerator to a denominator such that each ratio is specific to each filter, and wherein the method further comprises:

prior to said ascertaining whether the guaranteed memory bandwidth can be allocated to the first pipeline, computing the guaranteed memory bandwidth of the first pipeline as N1+D, wherein N1 is the numerator of the guaranteed ratio of the first filter in the sequence of filters and D is a sum of the denominators of the guaranteed ratio of all filters in the sequence of filters.

15. A computer system comprising a processor and a computer readable memory unit coupled to the processor, said memory unit containing program code configured to be executed by the processor to implement a method for allocating memory to a first pipeline, said method comprising:

ascertaining whether an optimum memory capacity can be allocated to a first pipeline that comprises a sequence of filters, wherein each filter is configured to execute a process specific to each filter, receive input data to enable execution of the process, and generate output data resulting from execution of the process, and wherein the output data generated by each filter except the last filter in the sequence is the input data to a next filter in the sequence;

if said ascertaining whether the optimum memory capacity can be allocated to the first pipeline ascertains that the optimum memory capacity can be allocated to the first pipeline, then allocating the optimum memory capacity to the first pipeline, else ascertaining whether a guaranteed memory bandwidth can be allocated to the first pipeline;

if said ascertaining whether the guaranteed memory bandwidth can be allocated to the first pipeline ascertains that the guaranteed memory bandwidth can be allocated to the first pipeline, then allocating the guaranteed memory bandwidth to the first pipeline, else currently releasing extra memory from a second pipeline if the second pipeline is not currently performing processing or subsequently releasing the extra memory from the second pipeline when the second pipeline subsequently completes performing processing that is currently being performed, followed by allocating the extra memory to the first pipeline.

16. The computer system of claim 15, wherein said ascertaining whether the optimum memory capacity can be allocated to the first pipeline ascertains that the optimum memory capacity can be allocated to the first pipeline.

17. The computer system of claim 15, wherein said ascertaining whether the optimum memory capacity can be allocated to the first pipeline ascertains that the optimum memory capacity cannot be allocated to the first pipeline, and wherein said ascertaining whether the guaranteed memory bandwidth can be allocated to the first pipeline ascertains that the guaranteed memory bandwidth can be allocated to the first pipeline.

18. The computer system of claim 15, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory can be currently released.

19. The computer system of claim 15, wherein said ascertaining whether the optimum memory capacity can be allocated to the first pipeline ascertains that the optimum memory capacity cannot be allocated to the first pipeline, wherein said ascertaining whether the guaranteed memory bandwidth can be allocated to the first pipeline ascertains that the guaranteed memory bandwidth cannot be allocated to the first pipeline, and wherein said ascertaining whether the extra memory can be currently released ascertains that the extra memory cannot be currently released.

20. The computer system of claim 15, wherein said ascertaining whether the optimum memory capacity can be allocated to the first pipeline ascertains that the optimum memory capacity cannot be allocated to the first pipeline, wherein each filter is characterized by a guaranteed ratio of memory usage expressed as a ratio of a numerator to a denominator such that each ratio is specific to each filter, and wherein the method further comprises:

prior to said ascertaining whether the guaranteed memory bandwidth can be allocated to the first pipeline, computing the guaranteed memory bandwidth of the first pipeline as N1+D, wherein N1 is the numerator of the guaranteed ratio of the first filter in the sequence of filters and D is a sum of the denominators of the guaranteed ratio of all filters in the sequence of filters.

* * * * *